Patented June 12, 1951

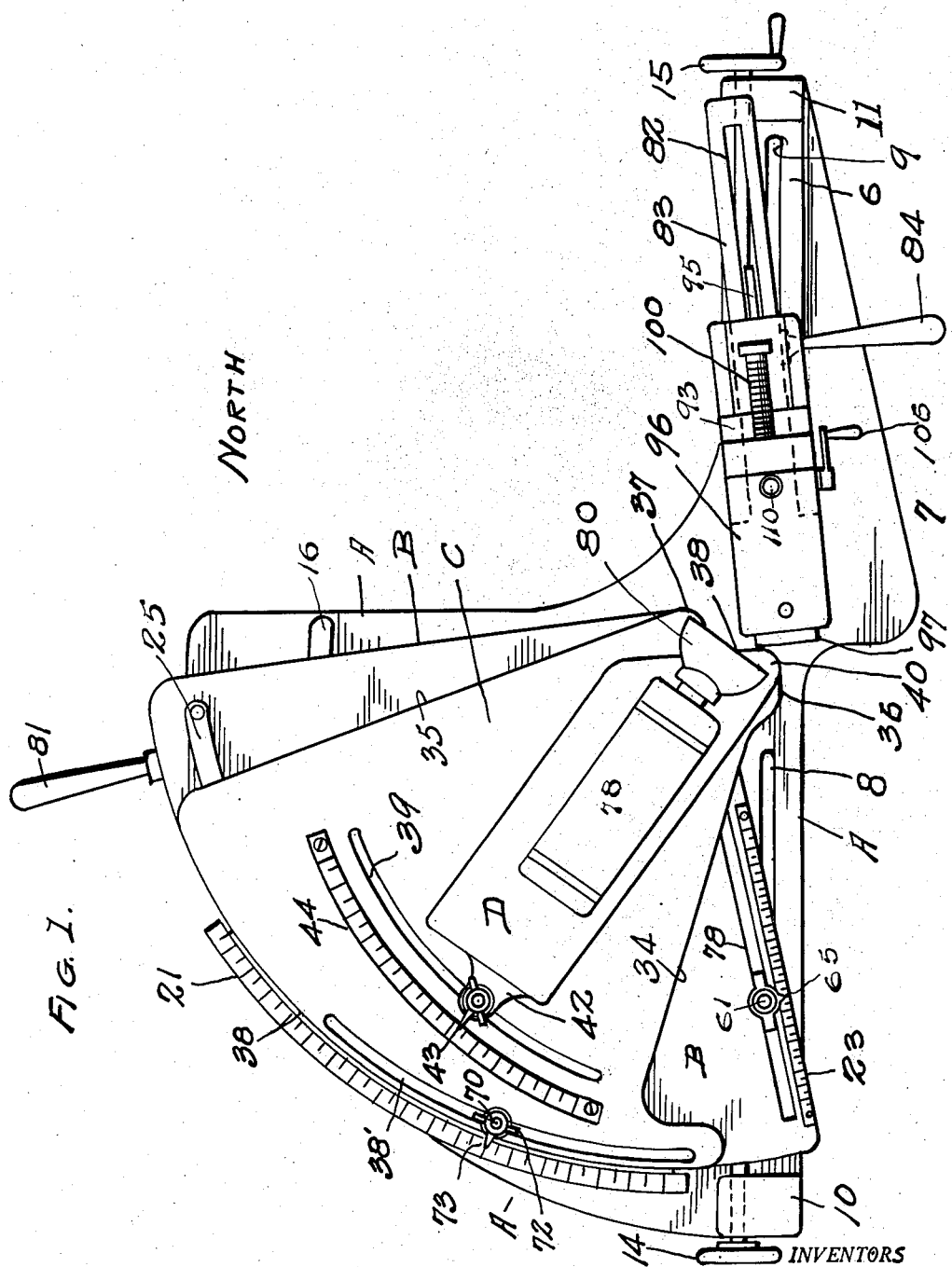

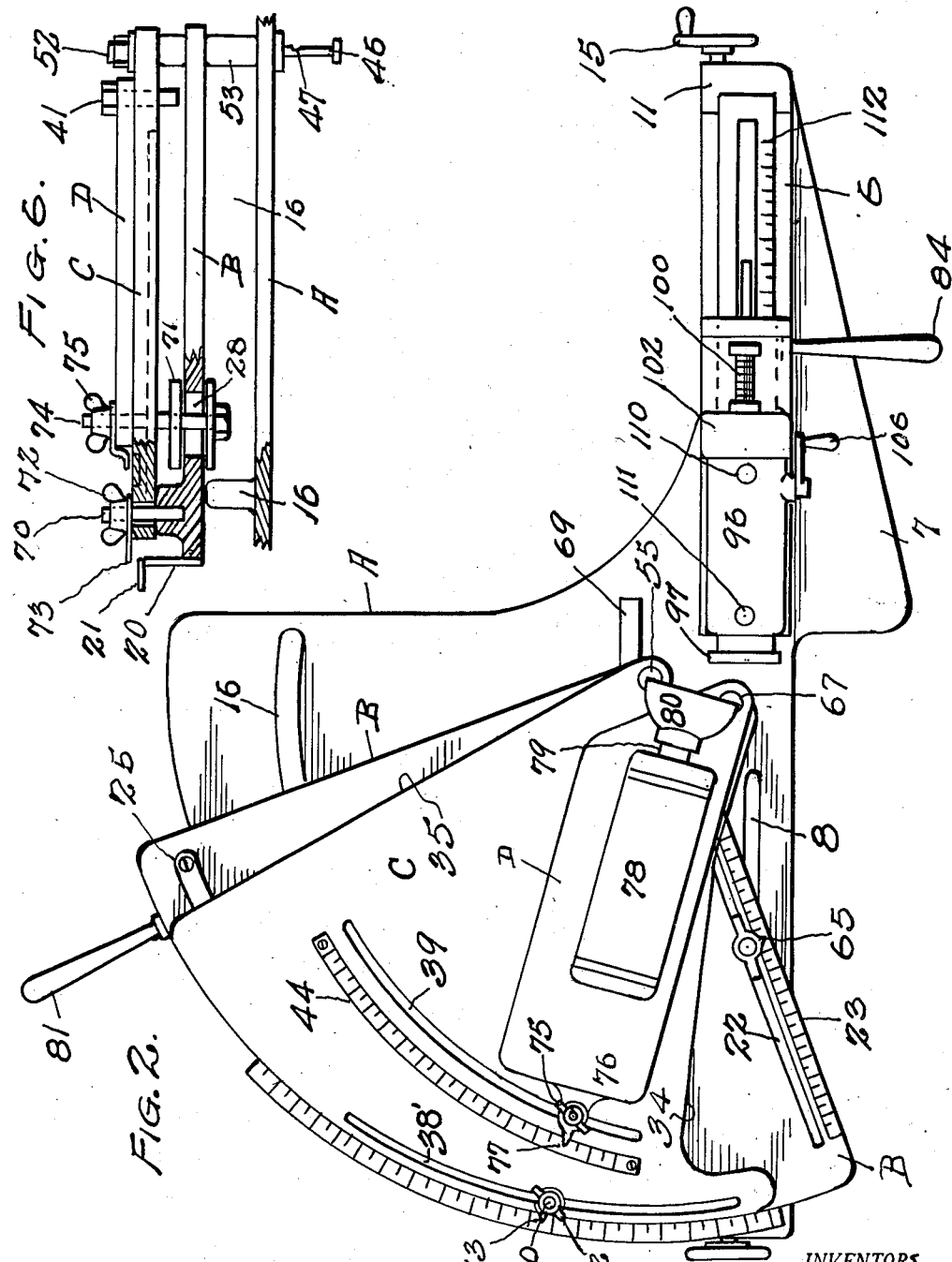

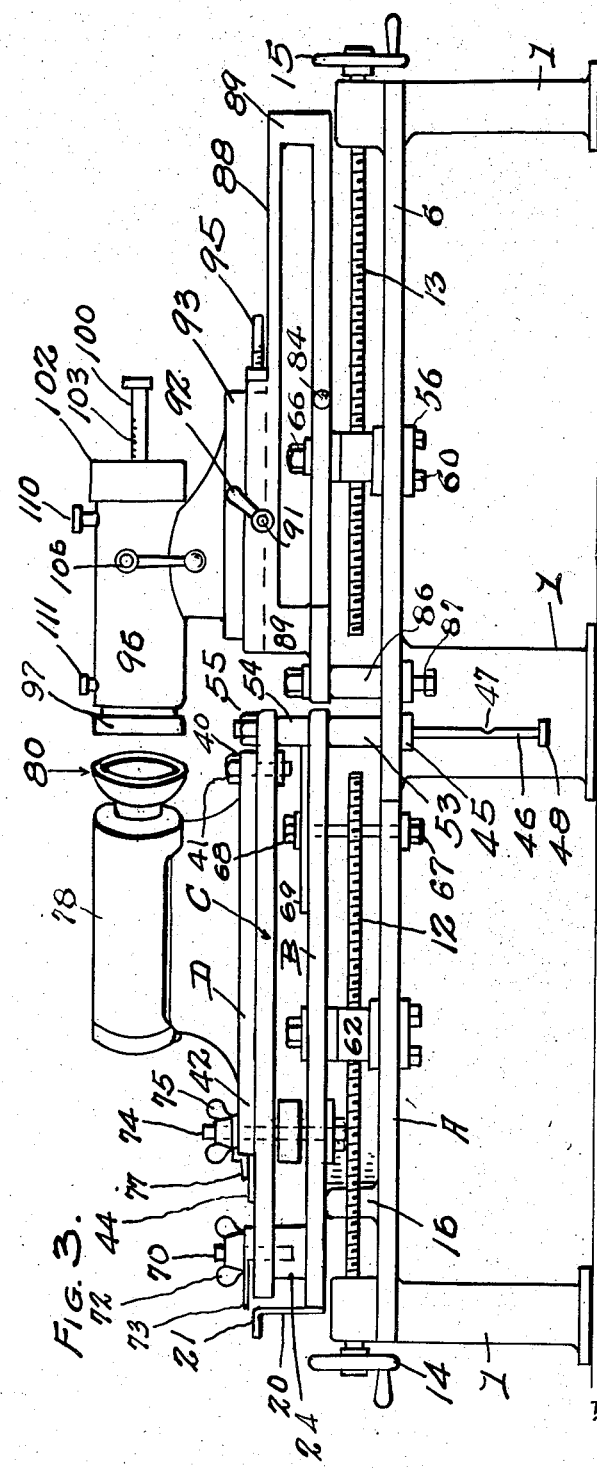
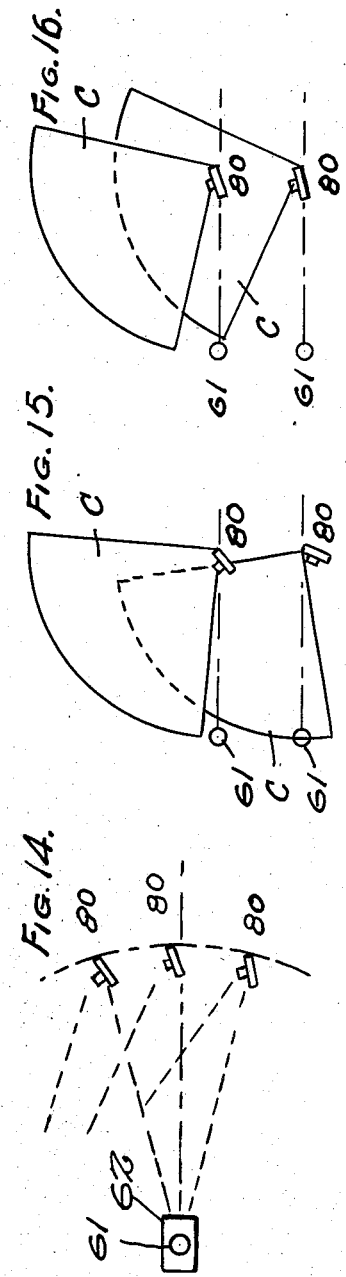

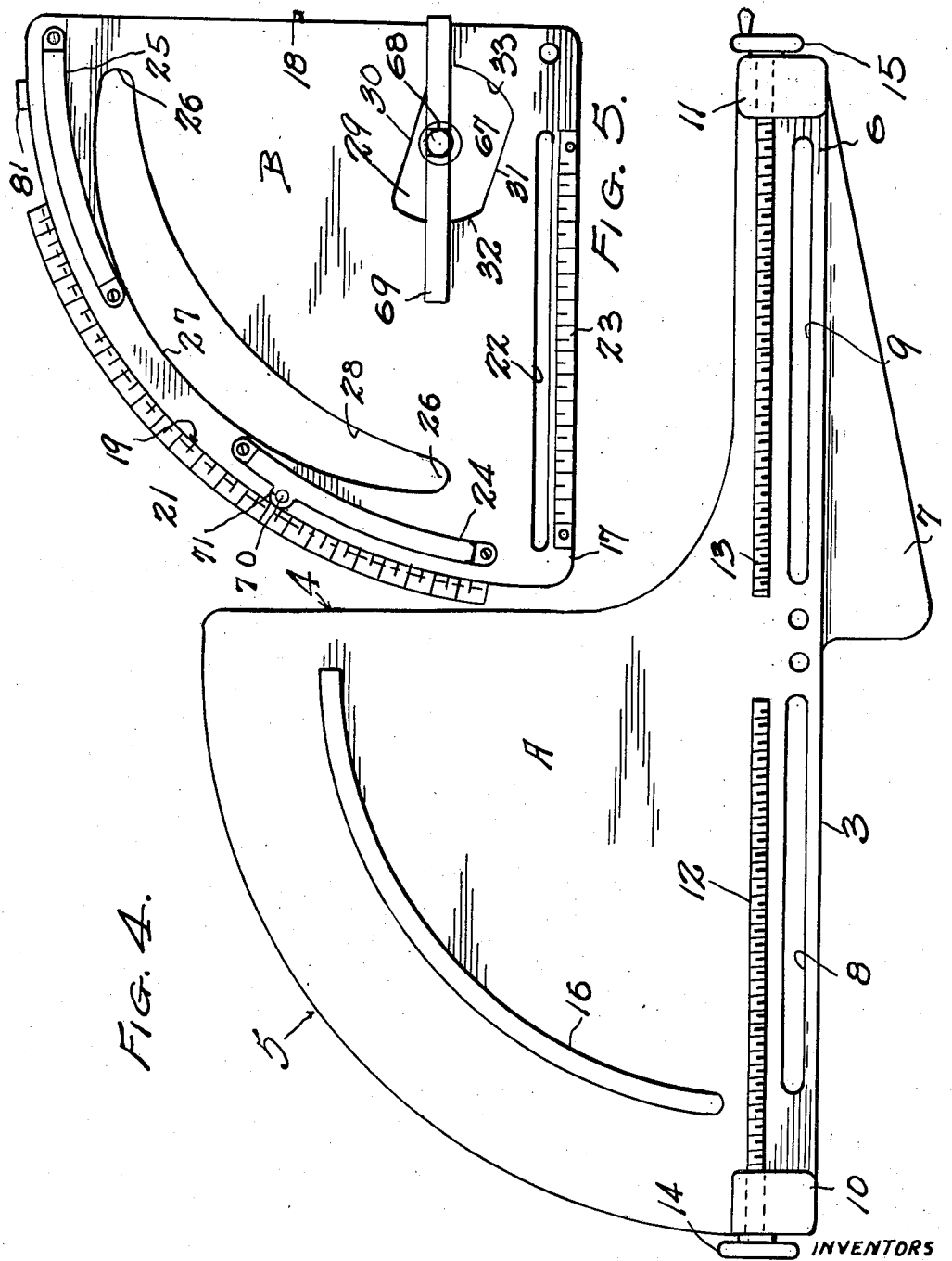

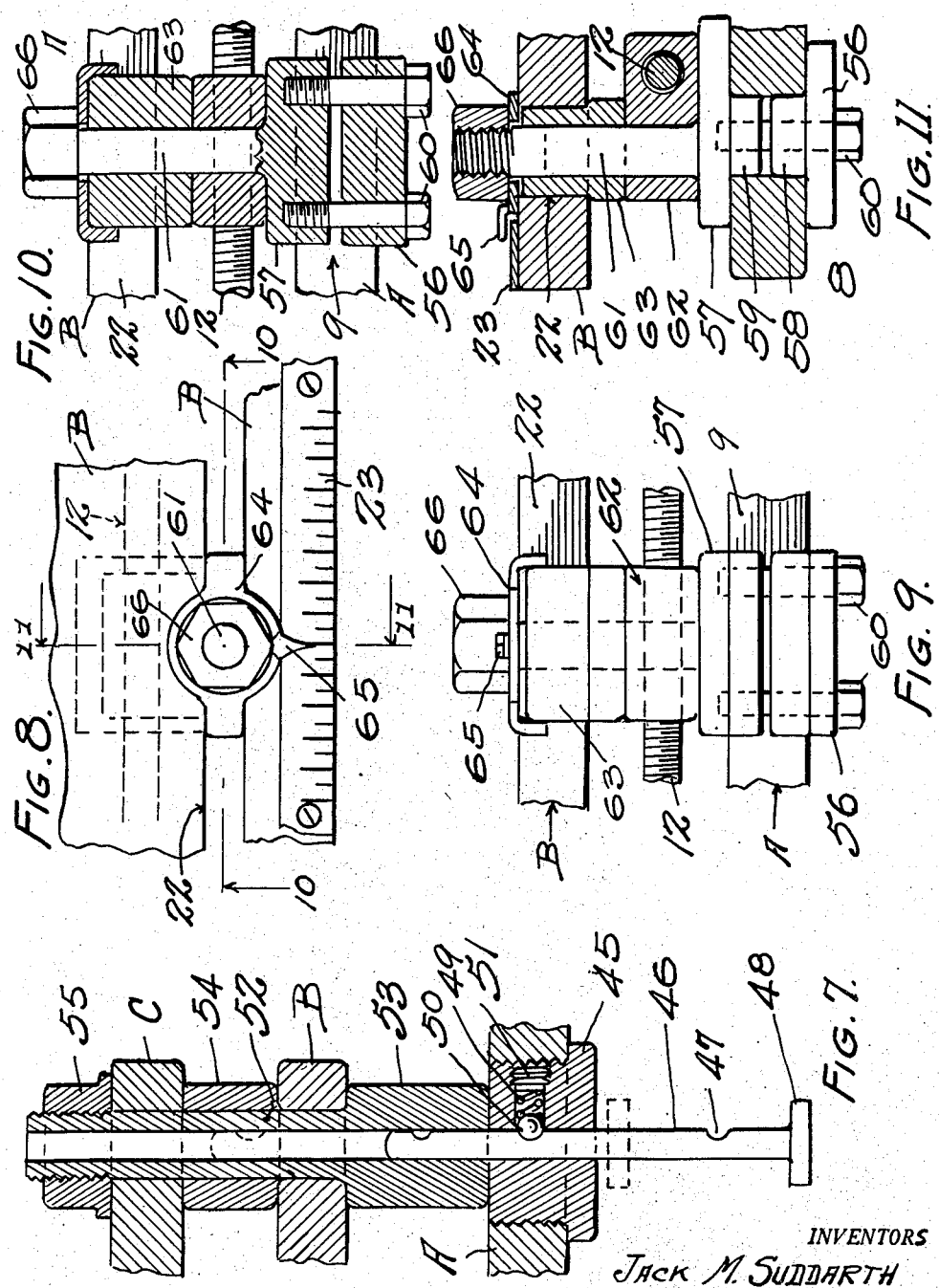

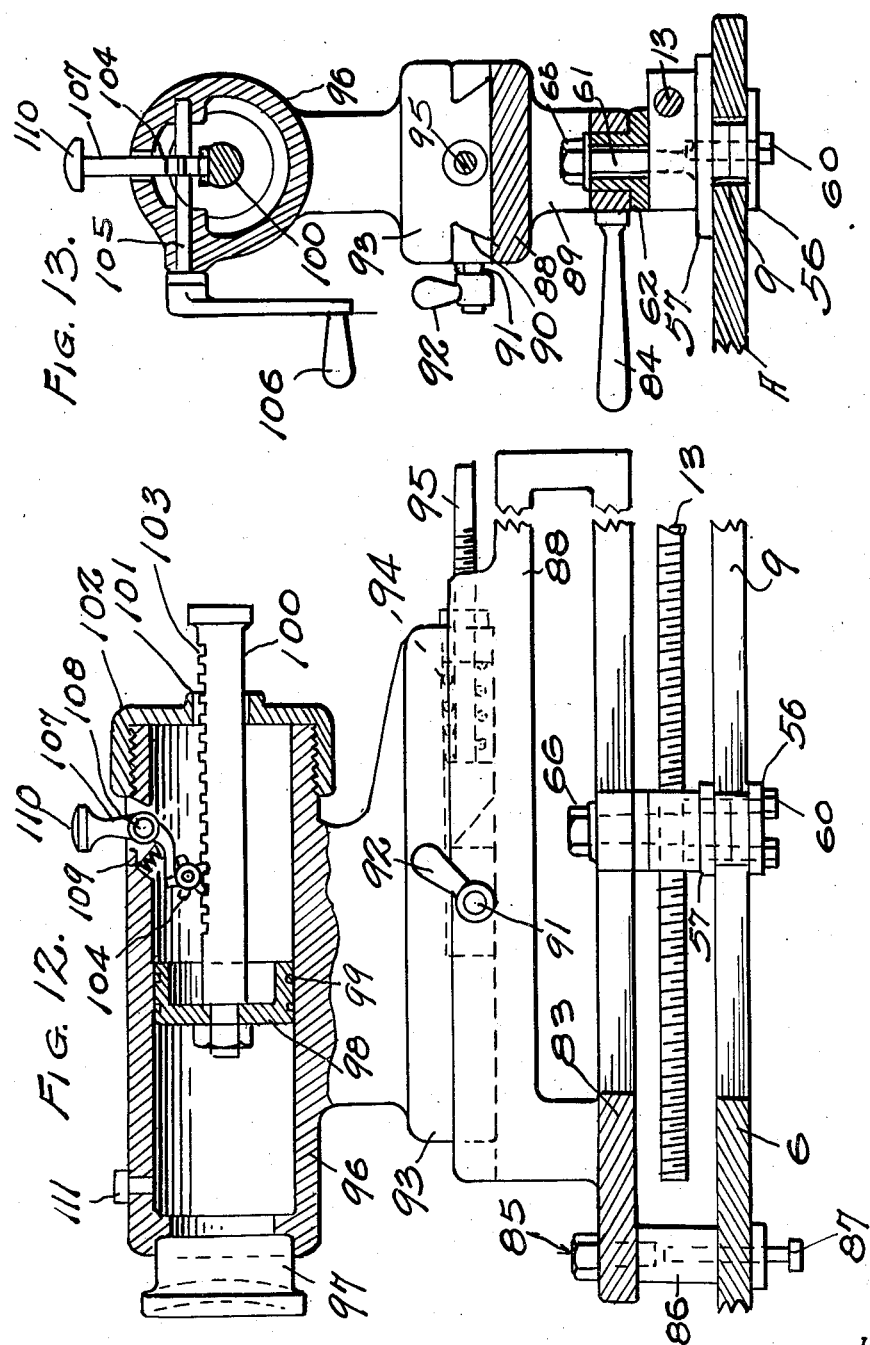

2,556,604

UNITED STATES PATENT OFFICE 2,556,604

COMPOUND LENS GENERATOR

Jack M. Suddarth and Hans H. Richarz, Milwaukee, Wis., assignors of one-fourth to Alfred G. Goldberg, Milwaukee, Wis.

Application February 15, 1949, Serial No. 76,594

11 Claims. (Cl. 51—55)

Our present invention relates to an improved lens generator of the type designed to grind astigmatic corrections on ophthalmic lenses and to grind concave and convex curves to accurate thickness and curvature in all meridians. By combining two radii we have succeeded in grinding a spherical and cylindrical surface in a single operation.

The simplicity of construction and operation of the device will be apparent in the light of the drawings and description hereinafter referred to and set forth. The generator of our invention is an improvement over the conventional machine inasmuch as small operating space is required for our machine without affecting its ability to grind either simple or compound curves.

In the accompanying drawings we have illustrated one complete example of the physical embodiment of our invention according to the best mode we have thus far devised but it will be understood that various changes and alterations may be made in the exemplified structure within the scope of the appended claims.

In the drawings:

Figures 1 and 2 are top plan views of the lens generator of our invention in different operating positions.

Figure 3 is a front elevational view of the generator.

Figure 4 is a top plan view of the base.

Figure 5 is a top plan view of the intermediate plate.

Figure 6 is a fragmentary front elevational view partially in section showing the supporting elements for the plates.

Figure 7 is a vertical sectional view through the floating pivot assembly.

Figure 8 is a top plan view of the slide block assembly.

Figure 9 is a front elevational view thereof.

Figure 10 is a vertical longitudinal sectional view at line 10—10 of Fig. 8.

Figure 11 is a transverse vertical sectional view at line 11—11 of Fig. 8.

Figure 12 is a longitudinal vertical sectional view through the lens holding assembly.

Figure 13 is a transverse vertical sectional view thereof.

Figures 14, 15, and 16 are diagrammatic views of various operating positions of the generator.

The lens generator of our invention includes five basic elements, viz., the base A, the intermediate plate B, the top plate C, the motor and supporting plate D, and the lens supporting assembly E.

These elements are movable relative to the base and to each other so as to provide a plurality of positions by means of which various lens forms and curvatures may be created or generated from the lens blank by setting and manipulating the controls in connection with the scales provided on the machine. With the knowledge of the radius or radii to be generated, the operator may set his controls, the various pointers set properly at the scale indications, and then with a single movement of the upper assembly including plates B, C, and D, the lens blank is ground and finished, except for the usual polishing.

Referring now to the drawings wherein we have illustrated the present preferred embodiment of our invention we provide a base-plate A, which as best seen in Fig. 4 is supported by legs 1 and provided with substantially right angled edges 3 and 4 and a curved edge 5. An extension 6 along edge 3 has a side nose 7 and elongated slots 8 and 9 are positioned near the edge 3 and parallel thereto. Abutments 10 and 11 form bearings for the threaded rods 12 and 13 having hand wheels 14 and 15 respectively, and an arcuate rib 16 on the plate 2 is concentric with the curved edge 5.

The intermediate plate B has right angled edges 17 and 18 and a curved edge 19 to which is secured the curved scale support 20 for scale 21. The plate B has a slot 22 along the edge 17 adapted to be aligned with the slot 8 of plate A and an adjacent scale 23, and near the curved edge 19 and concentrically disposed therewith are two spaced supporting ribs 24 and 25 secured by screws as shown. In close proximity to these ribs, we provide an opening or slot 26 formed with arcuate walls 27 and 28 of different radii so that the said slot or opening is crescent shaped. An additional opening 29 has parallel walls 30 and 31 and curved ends 32 and 33. The various slots or openings permit the securing bolts or other means for the superimposed plates while also permitting the relative horizontal movement thereof.

The upper plate C has angularly disposed edges 34 and 35 running from the noses 36 and 37 recessed therebetween at 38, and the edge 34 is set back to permit the easy viewing of the scale 23 therebelow. The plate C has a slot 38' concentric with its curved edge 38, the center of the radii being in nose 37, and also a curved slot 39, the center of radius being in nose 36.

The motor supporting plate D has a nose 40 pivotally secured to nose 36 as by bolt 41 and has a rear extension 42 ending near scale 44 of plate C, adjacent slot 39.

The base, and plates B and C are detachably pivotally connected by means of the assembly of Figure 7 wherein the base plate A has a threaded bushing 45 formed with a central bore for the elongated pin 46 having spaced notches 47 and a hand knob 48. The bushing has a lateral bore to house spring 49 to urge inwardly the ball 50, and a plug 51 closes the bore. Immediately above the bushing we use a stud 52 having an enlarged collar 53 and the stud extends up through plate B, collar 54, plate C, and is secure by nut 55. Thus with the pin in its lowest position, plates B and C are pivotally secured to each other, but are free to move relative to the base, while with the pin up into the stud, the base and plates B and C are locked together.

When the upper plate B is free of pivot pin 46, the plate B is pivotally secured thereto by means of the slide block assembly of Figures 8, 9, 10, and 11.

This assembly includes the spaced plates 56 and 57 below and above the base plate 2 and formed with ribs 58 and 59 in the slot 8. Screws 60 secure these plates 56 and 57 together and the upper plate 57 has a stud extension 61 passing through slide block 62 eccentric thereof, and the rod 12 threadedly engages the block 62 so that rotary movement of the rod will reciprocate the block and its assembly in and above the slot 8. A bushing 63 on stud 61 moves in slot 22 of plate B and a cap plate 64 has a pointer 65 co-acting with scale 23 and the assembly is secured by nut 66.

Now as best seen in Fig. 3 plate B rests on rib 16 and collar 53 and it is secured by bolt 67 and nut 68 which clamp bar 69 over opening 29 in plate B. Then bolt 70 countersunk in plate B extends up through the ear 71 of rib 24 and the wing nut 72 bears on plate C over slot 38' through which bolt 70 also extends.

A pointer 73 on this bolt co-acts with scale 21 to determine the position of plate B relative to plate A.

Plate C rests on ribs 24 and 25, is pivotally connected to plate B by stud 52, and is further secured by bolts 74 countersunk in plate C extending upwardly through the nose 36 of plate D and wing nut 75 which also secures cap plate 76 having a pointer 77 for scale 44.

The motor plate D has thereon a suitable electric motor 78 operating drive shaft 79 on which is secured a conventional open center grinder 80.

Thus it will be seen that base A stays in fixed position. The plates B and C are pivotally mounted thereon by adjustable pivot 62 according to scale 23 to determine one radius of lens grinding, and plates B and C are pivotally secured on pivot 52 according to scale 21 to determine the second radius of lens grinding. Further, the angle of the motor may be adjusted by moving the plate D on pin 41 relative to plate C according to scale 44. A handle 81 on plate B permits the swinging of plates B and C, as adjusted, to move the grinder over the lens blank as will be hereafter described.

The lens mount assembly is mounted on the extension 6 of plate A and the slot 9 has therein a slide block assembly adapted for adjustment in slot 82 of slide-frame 83 which has a handle 84.

The slide frame 83 is pivoted forwardly on pin or bolt 85 secured in bushing 86 which spaces slide-frame 83 from extension 6. A pin 87 is movably vertically in the bushing and by suitable means as the assembly of Figure 7, the pin may be raised to lock 83 and 6 together.

In Figs. 12 and 13 where the slide block 57a is actuated by the hand-screw 13, the block may be fixed to the base-plate A by means of clamp 56a and bolt 60a, and the slide-block may be locked in the slot 82 of the slide-frame 83 by means of a screw bolt 61a, which is passed upwardly through a cap 62a of the block, and clamped by nut 66a.

The slide-frame 83 is provided with a truss 88 supported on end posts 89, and the upper face of the truss is recessed or grooved to form dovetail walls 90. A set screw 91 is threaded into one of the walls and rotated by handle 92 for coaction with the tongue 93 of a slide block that is grooved laterally, to fit snugly into the groove or recess of the truss, and in a pocket of the tongue we employ a spring 94 to tension the slide-block against the truss; and the tension may be adjusted by means of a screw rod or bar 95.

Above the slide block, we support a cylinder 96 and in the open, countersunk front end we seat a lens block 97 forming a seat for the lens to be ground. To hold the lens block in position, we employ air pressure and this pressure is effected by the piston head 98 having rings 99 on rod 100, the end thereof extending through aperture 101 of cylinder head 102. The piston rod is formed with a rack 103 engaging pinion 104 on shaft 105 which is rotated by crank 106. A dog 107 pivoted at 108 and urged by spring 109 engages the pinion as a ratchet to prevent retrograde movement as the rod is pulled to reduce the pressure between the piston head and the lens blank. Pressure on button 110 will release the ratchet and allow the removal of the ground lens after the operation is completed. A vent valve 111 is provided in the cylinder. A scale 112 is provided on the plate 83 to determine the location of the pivot for the assembly E on its slide block assembly.

In the diagrammatic Figures 14, 15, and 16, where the relation of the grinding tool 80, the swivel bolt 61 and its adjustable slide block 62, and the plate C, are illustrated, the arcuate movement and the radial movement of the grinder, with relation to the lens, for changing the angle of cuts are shown by dot and dash lines. In Fig. 14 the grinder follows the arcuate line which provides the radius lines and the radius lines may be lengthened or shortened, between the swivel pin 81 and the grinder 80, for changing the cut and the angle of the cut with relation to the lens.

The operation of the lens generator above described may be set forth as follows. First the plates A, B, and C are aligned and the pin 46 is engaged in the stud 52 to lock the plates together so that the slots 22 and 8 are vertically aligned. This is necessary so that a definite radius may be established when nut 66 is loosened.

The next step is to turn the crank wheel 14 moving the slide block 62 to the proper setting for the desired dioptric sphere radius and then tighten the lock nut 66. The bottom portion of the slide block assembly is rigid and fits snugly so that when the lock nut is tightened a firm and secure pivot connection is formed.

We next loosen the nut 70 and move plate C about the pivot point 52 to the desired reading on scale 21 for the optical prescription for cylinder power. Now we have obtained definite radii by setting the pivots 62 and 52 for the grinder 80. If desired the motor plate D may be adjusted to effect further variations, and obviously any setting may be in the neutral position.

Now with all lock nuts tight, the pin 46 is released and the operator stands in the position indicated as North, grasping the handle 81, and pushes away from himself, or counterclockwise in Figure 1. This movement brings diamond grinder 80 over and to the left of lens block mount 96. The lens 97 is then secured as described in the cylinder and the lens assembly is adjusted longitudinally and/or pivotally as required. The electric motor is then activated and coolant from a suitable source is supplied to the lens blank.

At this juncture we are prepared to make a preliminary cut approximately one-half inch in on the edge of the blank. This is done to determine the lens thickness at the present setting so that the amount to be removed may be determined. For example, if after making the preliminary cut we have 4 mm. of thickness and we require 2.5 mm., we find that we must remove 1.5 mm. to obtain the proper thickness. By backing the grinder away from the lens and swinging the assembly under control of handle 81, the set screw 95 is adjusted, and the lens assembly moved according to scale 112 out 1.5 revolutions, the rod 95 being threaded so that one turn equals 1 mm. of longitudinal movement and the proper thickness adjustment of the lens is obtained.

We can now make a complete grinding operation and with the operator still in the position North, he grasps the handle 81 and pulls it toward him with a slow even pressure. When the grinding tool passes fully across the lens blank, the lens is finished and the lens may be removed by relieving the inner pressure thereon. Thus in one operation, compound curves both spherical and cylindrical have been formed on the lens.

As an example of the necessary setting for a specific prescription, assume a lens prescription of $$\frac{-6.00}{2.25}$$

with lens thickness of .10 or 2 mm. at the thickest portion.

First set the pivot point 62 at point −6 on scale 23; then add 6.00 plus 2.25 which equals 8.25 and set the pointer on plate C for scale 38 at 8.25. The two meridians have thus been located and established and following the previously disclosed steps, the lens may be ground in the two meridians simultaneously.

From the above description it will be apparent that the lens generator of our invention is simple in construction and is easy to use, and will reduce the time previously required to produce the two curvatures in a lens by a considerable portion, and that the lens so generated will require no further treatment for use.

Having thus fully described our invention what we claim as new and desire to secure by Letters Patent is:

1. A lens generator comprising a fixed baseplate, and a work holder adjustably supported thereon, a second plate slidably mounted on the base plate and said plates having longitudinally extending slots aligned vertically, a slide block in the slot of the baseplate and a pin in the block pivotally secured in the slot of the second plate, a top plate pivotally secured to the second plate at a point beyond and longitudinally aligned with the slot of the second plate, a motor and an annular grinder operably secured upon the top plate, the longitudinal motor and grinder axis being non-radial to the radius of the second pivot point whereby the grinder when moved across the face of the lens will simultaneously produce both spherical and cylindrical curves.

2. A lens generator comprising a fixed baseplate, and a work holder adjustably supported thereon, a second plate slidably mounted on the base plate and said plates having longitudinally extending slots aligned vertically, and a slide block in the slot of the base plate and a pin in the block pivotally secured in the slot of the second plate, means for moving the block and pin in their respective slots, a top plate pivotally secured to the second plate at a point beyond and longitudinally aligned with the slot of the second plate, a motor and an annular grinder operably secured on the top plate, the longitudinal motor and grinder axis being non-radial to the radius of the second pivot point whereby the grinder when moved across the face of the lens will simultaneously produce both spherical and cylindrical curves.

3. A lens generator comprising a fixed base plate and a work holder adjustably supported thereon, a second plate slidably mounted on the base plate and said plates having longitudinally extending slots aligned vertically, and a slide block in the slot of the base plate and a pin in the block pivotally secured in the slot of the second plate, means for moving the block and pin in their respective slots along an extension line from the optical axis of the lens, a top plate pivotally secured to the second plate at a point beyond and longitudinally aligned with the slot of the second plate, a motor and an annular grinder on the top plate, the longitudinal motor and grinder axis being non-radial to the second pivot whereby the grinder when moved across the face of the lens will simultaneously produce both spherical and cylindrical curves.

4. A lens generator comprising a fixed base plate and a work holder adjustably supported thereon, a second plate slidably mounted on the base plate and said plates having longitudinally extending slot aligned vertically, and a slide block in the slot of the base plate and a pin in the block pivotally secured in the slot of the second plate, screw operated means for moving the block and pin in their respective slots along an extension line from the optical axis of the lens, a top plate pivotally secured to the second plate at a point beyond and longitudinally aligned with the slot of the second plate, a motor and an annular grinder on the top plate, the longitudinal motor and grinder axis being non-radial to the second pivot point whereby the grinder when moved across the face of the lens will simultaneously produce both spherical and cylindrical curves, and means limiting the pivotal movement of the upper plates relative the base plate.

5. A lens generator comprising a fixed base plate and a work holder adjustably supported thereon, a second plate slidably mounted on the base plate and said plates having longitudinally extending slots aligned vertically, and a slide block in the slot of the base plate and a pin in the block pivotally secured in the slot of the second plate, screw-operated means for moving the block and pin in their respective slots along an extension line from the optical axis of the lens, a top plate pivotally secured to the second plate at a point beyond and longitudinally aligned with the slot of the second plate, a motor and an annular grinder on the top plate, the longitudinal motor and grinder axis being non-radial to the second pivot point whereby the grinder when moved across the face of the lens will produce simultaneously both spherical and cylindrical curves, means limiting the pivotal movement of the upper plates relative the bed plate, and means detachably securing the upper plates and the base plate during initial adjustments.

6. In a lens generator, the combination with a base plate having a longitudinally extending slot, an intermediate plate having a complementary slot and a swivel support on the base in alinement with the longitudinally extending slot, an adjusting block slidably mounted in said slots, a manually operated screw journaled in the base plate threaded through the block and disposed laterally of the longitudinally extending slot, and means for retaining the intermediate plate in adjusted position, of an upper plate having a pivotal support on the intermediate plate eccentric of the swivel support, coacting means on the intermediate plate and upper plate for retaining the latter plate in adjusted position, and power-operated grinding mechanism mounted on the upper plate in operative position with relation to the swivel support and the pivotal support.

7. In a lens generator, the combination with a base-plate and its longitudinal slot, an intermediate plate having a slot, a swivel support on the base-plate in alinement with the longitudinal slot, an adjusting block mounted in said slots, and a manually operated screw journaled in the base plate threaded through the block and disposed laterally of the longitudinal slot, of an upper plate having a pivotal support on the intermediate plate eccentric of the swivel support, said intermediate and upper plates having arcuate slots and clamping means in these slots, and power-operated grinding mechanism mounted on the upper plate in operative relation to the swivel support and the pivotal support.

8. In the lens generator described, the combination with a base-plate, an intermediate plate having a pivotal support thereon, and a spaced top plate, of a tubular swivel-bolt having a lower head and forming bearings for the intermediate plate and the top plate, a coupling pin mounted in the base plate and slidable in the tubular swivel-bolt, and a spring pressed detent located in the base plate for coaction with the pin for retaining it in vertically adjusted position.

9. In the lens generator described, the combination with a base-plate having a longitudinally extending guide-slot, an elevated slide frame having a complementary slot and pivotally supported on the base-plate in line with the guide-slot, of an adjusting block slidably mounted in these slots, a manually operated screw threaded through the block and journaled in the base-plate laterally of and parallel with the guide slot, a longitudinally adjustable lens holder mounted in the slide frame, and means for retaining said holder in adjusted position.

10. In a lens generator, the combination with a base-plate, a slide frame pivotally mounted therein, and means coacting with the base-plate and slide frame for pivotally adjusting the slide frame, of a longitudinally adjustable slide block mounted in the slide frame and means for retaining the block in adjusted position, a lens blank holder rigid with the slide block and including a pneumatic cylinder, a piston in the cylinder and a stem for the piston forming a rack bar, a manually operated shaft journaled in the cylinder, and a pinion on the shaft coacting with the rack bar.

11. In a lens generator for simultaneously producing spherical and cylindrical curves, the combination with a fixed base plate, an adjustable lens-holder mounted thereon, and a pivotal support on the base plate adjacent the lens-holder, of an intermediate plate and an upper plate mounted for relative rotary adjustment on the pivotal support and coacting means on the base plate and intermediate plate for retaining the latter in adjusted position, a pivotal connection between the upper plate and the intermediate plate laterally offset from and movable with relation to the pivotal support, coacting means between the intermediate plate and the upper plate for retaining the latter in rotatably adjusted position, an annular grinder mounted on the upper plate in operative relation to the lens-holder, and means for operating the grinder.

JACK M. SUDDARTH.
HANS H. RICHARZ.

REFERENCES CITED

The following references are of record in the file of this patent:

UNITED STATES PATENTS

| Number | Name | Date |
|---|---|---|
| 397,835 | Cuthbert | Feb. 12, 1889 |
| 904,679 | Bruton | Nov. 24, 1908 |
| 1,901,181 | McCabe | Mar. 14, 1933 |
| 2,065,103 | Simpson | Dec. 22, 1936 |
| 2,352,180 | Bolsey | June 27, 1944 |

FOREIGN PATENTS

| Number | Country | Date |
|---|---|---|
| 23,334 | Great Britain | Dec. 1, 1914 |